US006781806B2

(12) United States Patent
Hashimoto et al.

(10) Patent No.: US 6,781,806 B2
(45) Date of Patent: Aug. 24, 2004

(54) ON-VEHICLE ELECTRONIC CONTROL DEVICE

(75) Inventors: Kohji Hashimoto, Tokyo (JP); Katsuya Nakamoto, Tokyo (JP); Tetsushi Watanabe, Tokyo (JP); Manabu Yamashita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 191 days.

(21) Appl. No.: 10/122,196

(22) Filed: Apr. 16, 2002

(65) Prior Publication Data

US 2003/0086226 A1 May 8, 2003

(30) Foreign Application Priority Data

Nov. 7, 2001 (JP) .................................... P2001-342239

(51) Int. Cl.[7] .................................................. H02H 3/20
(52) U.S. Cl. ...................................................... 361/91.1
(58) Field of Search ................................ 361/91.1, 93.1; 363/50; 323/276, 281, 282, 284, 285

(56) References Cited

U.S. PATENT DOCUMENTS 5,570,004 A * 10/1996 Shibata ....................... 323/303
6,201,674 B1 * 3/2001 Warita et al. ................. 361/18
6,411,068 B1 * 6/2002 Willis ......................... 323/282
6,538,866 B1 * 3/2003 Hanzawa et al. .......... 361/91.1

FOREIGN PATENT DOCUMENTS

JP 2000-276267 10/2000

* cited by examiner

*Primary Examiner*—Brian Sircus
*Assistant Examiner*—James A Demakis
(74) *Attorney, Agent, or Firm*—Sughrue Mion, PLLC

(57) ABSTRACT

An IC element 20*a* provided with input-output interface circuits 23, 24 and a control circuit 22*a* includes: a constant voltage control circuit 21*a* comprising a switching circuit 25*a* for conduction control of a switching element 11*a* connected to a power supply terminal 2*a* of an on-vehicle electronic control device 1*a*; and a comparison circuit 26 for opening the switching element 11*a* when a voltage of the first terminal Vdd1, to which an output voltage of the switching element 11*a* is supplied, is below a predetermined value; in which the input-output interface circuits 23, 24 is supplied with power from the first terminal Vdd1, while the control circuit 22*a* is supplied with power from the second terminal Vdd2 connected to an output circuit of the switching element 11*a*.

15 Claims, 6 Drawing Sheets

ON-VEHICLE ELECTRONIC CONTROL DEVICE

BACKGROUND OF THE INVENTION

1. Field of the Invention

The present invention relates to an on-vehicle electronic control device and, more specifically, to an on-vehicle electronic control device incorporating a stabilized power supply circuit.

2. Background Art

In general, an on-vehicle electronic control device for fuel injection control, ignition control, air-supply valve switching control, etc. is comprised of a single piece of electronic circuit board enclosed built in a sealed box. And a control circuit comprised of input-output interface circuits in association with on-vehicle input-output equipment, microprocessor, and various memories are mounted on the mentioned electronic circuit board.

The mentioned interface circuits and control circuit are driven through a stabilized power supply circuit to which power is supplied by an on-vehicle battery, and a power supply circuit for such operation is mounted on the mentioned electronic circuit board.

In this respect, 1-chip type or 2-chip type microprocessors are popularly used and, further, some of 1-chip microprocessors are used in combination with a logical circuit portion. Therefore, in many cases, a plurality of main integrated circuits is employed in the mentioned electronic circuit board.

For example, in the Japanese Patent Publication (unexamined) No. 276267/2000 titled “Electronic control device for vehicles”, first and second microprocessors are used and, further, constant voltage control power transistors and voltage control power supply integrated circuits (hereinafter “integrated circuit” are hereinafter referred to as “IC”) are incorporated.

Also, in the Japanese Patent Application No. 173124/2000 titled “Power supply device for on-vehicle computing device”, an on-vehicle electronic control device is disclosed in which two systems of stabilized power supply, a 5V system and a 3.3V system, are provided by series transistors.

In the foregoing prior arts, in addition to the IC element working as an on-vehicle electronic control device, it is necessary to mount specific parts for constant voltage control circuit to obtain a stabilized power supply on the electronic circuit board or to add an IC element for power supply circuit.

Accordingly, a problem exists in that the constant voltage control circuit comprising specific parts increase occupancy area of the electronic circuit board, and particularly in the power supply of two systems, the occupancy area will become excessively large.

Further, even when specific parts or a dedicated IC element for voltage control are employed, if any imperfect contact or circuit disconnection takes place in voltage control feedback circuit, a switching element for feeding from power source may be fully conductive. As a result, there is a possibility of applying an excessive voltage to microprocessor, etc.

SUMMARY OF THE INVENTION

The present invention has been made to solve the above-discussed problems, and has an object of providing an on-vehicle electronic control device forming a power supply circuit not requiring any dedicated IC element or specific parts for voltage control and capable of improving safety level against trouble such as disconnection of voltage control feedback circuit, by incorporating a constant voltage control circuit in an on-vehicle electronic control IC element.

Another object of the invention is to provide an on-vehicle electronic control device forming a power supply circuit capable of improving inspection precision in current consumption of each individual IC element itself.

An on-vehicle electronic control device according to the invention includes: an IC element including an input-output interface circuit connected to on-vehicle input-output equipment and a control circuit; and in which a stabilized voltage is supplied from a power supply terminal connected to an on-vehicle battery to the IC element through a switching element.

The IC element incorporates a voltage control circuit for conduction control of the switching element so that a voltage of a first terminal to which an output voltage of the switching element is supplied becomes a predetermined voltage, and a second terminal to which an output voltage of the switching element is supplied.

And the input-output interface circuit and the control circuit are supplied with a power separately either from the first terminal or from the second terminal.

As a result, there is an advantage that number of parts is reduced and the on-vehicle electronic control device is small-sized as a whole, and assembly time can be shortened. Furthermore, inspection of current consumption can be performed with a high precision prior to incorporating the IC elements, and therefore defective rate of finished products is reduced.

It is preferable that the voltage control circuit includes: a comparison circuit for generating an output when a voltage of the first terminal, to which an output voltage of the switching element is supplied, is lower than a predetermined voltage; and a switching circuit for controlling conduction of the switching element depending on output of the comparison circuit.

As a result, constant voltage control for obtaining a stabilized voltage suitable for an on-vehicle electronic control device can be performed with a simplified circuit.

It is preferable that the on-vehicle electronic control device according to the invention further includes a second IC element including an input-output interface circuit, microprocessor and various memories; and a second switching element connected in series to the switching element for supplying a stabilized low voltage to the microprocessor and memories. And the input-output interface circuit for the microprocessor is supplied with a power from a third terminal connected to the output circuit of the switching element.

As a result, in the on-vehicle electronic control device having voltage control circuit of two systems, number of parts is reduced and the on-vehicle electronic control device is small-sized as a whole, and assembly time can be shortened. Furthermore, inspection of current consumption can be performed with a high precision prior to incorporating the IC elements, and therefore defective rate of finished products is reduced.

It is preferable that the voltage control circuit includes a second constant voltage control circuit comprising a second comparison circuit for generating an output when a voltage of a low voltage terminal, to which an output voltage of the second switching element is supplied, is lower than a predetermined voltage; and a second switching circuit for controlling conduction of the second switching element so that the stabilized low voltage is obtained depending on output of the second comparison circuit.

As a result, it is possible to perform a constant voltage control for obtaining stabilized voltage of two systems suitable for the on-vehicle electronic control device with a simple circuit.

It is preferable that a diode is incorporated and connected between the first and the second terminals of the IC element in such a manner that a direction from the second terminal to the first is a forward direction. And the comparison circuit is supplied with a power through the diode when any imperfect contact takes place in a circuit to which power is supplied from the first terminal.

As a result, it is possible to prevent the IC element from any trouble that may lead to a serious accident due to application of an excessive voltage to the IC element in case of a disconnection trouble in any feedback circuit for voltage control. Furthermore, inspection of current consumption can be performed with a high precision prior to incorporating the IC elements, and therefore defective rate of finished products is reduced.

It is preferable that the IC element incorporates an abnormal voltage comparison circuit for monitoring voltage variation in the second terminal and generating an alarm output when the monitored voltage exceeds a predetermined value.

As a result, when any imperfect contact occurs in the circuit, to which power is supplied from the first terminal, the alarm output is activated and gives a warning to stop the vehicle, urging the vehicle driver to repair the on-vehicle electronic control device.

It is preferable that the IC element includes a current detecting element for detecting a current running from the second terminal toward the first terminal, and an abnormal current comparison circuit for generating an alarm output when a current detected by the current detecting element exceeds a predetermined value.

It is preferable that the IC element includes a voltage comparison/memory circuit for monitoring voltage variation in the second terminal and acting on the switching circuit to shut off the switching element when the monitored voltage exceeds a predetermined value, and for storing such an abnormal state. And the voltage comparison/memory circuit is supplied with a power from an input voltage circuit of the switching element.

It is preferable that the IC element includes a current detecting element for detecting a current running from the second terminal toward the first terminal, and a current comparison/memory circuit for acting on the switching circuit to shut off the switching element when the monitored current exceeds a predetermined value, and stores such an abnormal state. And the current comparison/memory circuit is supplied with a power from an input voltage circuit of the switching element.

As a result, it is possible to prevent the interface circuit and control circuit of the IC element from any burning failure that may lead to a serious accident due to application of an excessive voltage to the IC element in case of a disconnection trouble in any circuit to which a power is supplied from the first terminal. Further, the switching element remains shut off, thus making it possible to promptly stop the vehicle.

DESCRIPTION OF THE PREFERRED EMBODIMENTS

Embodiment 1

Figure 1:
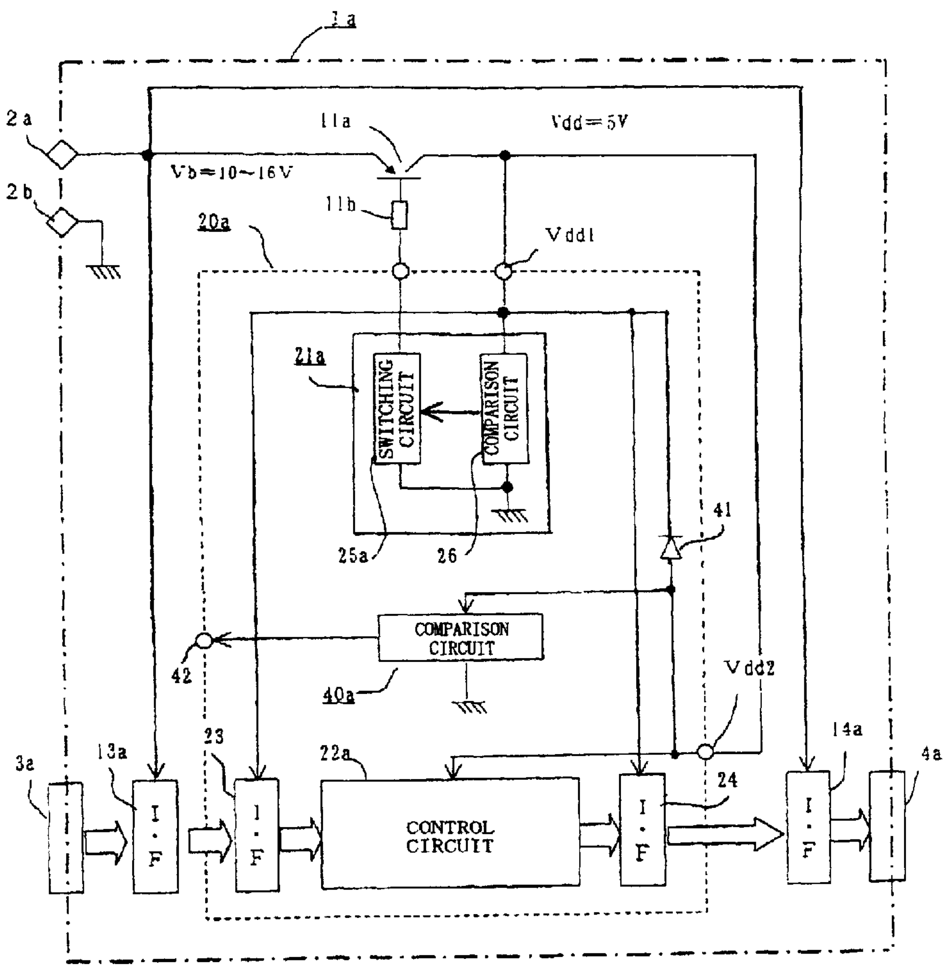
FIG. 1 is a block circuit diagram according to Embodiment 1 of the present invention.

FIG. 1 is a block diagram showing a circuit according to Embodiment 1 of the present invention. Referring to FIG. 1, reference numeral 1*a* is an on-vehicle electronic control device consisting of an electronic circuit board accommodated in a sealed box not shown. Numerals 2*a* and 2*b* are positive and negative power supply terminals connected to an on-vehicle battery not shown through a power supply switch not shown. Numeral 3*a* is an input connector to which input signals such as ON/OFF signal or analog signal, etc. are supplied from various on-vehicle-input equipment such as crank angle sensor, air supply sensor, etc. Numeral 4*a* is an output connector to which ON/OFF driving signal is supplied for various on-vehicle output equipment such as fuel injection electromagnetic valve, ignition coil, etc.

Numeral 11*a* is a switching element for power transistors, etc. connected between the power supply terminal 2*a* and the first terminal Vdd1 and second terminal Vdd2 disposed in an IC element 20*a* described later. Numeral 11*b* is a base resistance for conduction control of the mentioned switching element. The mentioned switching element 11*a* is controlled so as to generate a constant voltage of, for example, Vdd=5V as a stabilized voltage.

Numeral 13*a* is an input interface circuit for converting a signal voltage of on-vehicle input equipment for DC12V system into a voltage for DC5V system, and in which resistance elements, etc. consuming too much power to be incorporated in the later described IC element 20*a* are used.

Numeral 14*a* is an output interface circuit for driving on-vehicle output equipment of, for example, DC12V system, in which power transistors, etc. consuming too much power to be incorporated in the later described IC element 20*a* are used.

In the IC element 20*a* of above arrangement, numeral 21*a* is a constant voltage control circuit for the mentioned switching element 11*a*. This constant voltage control circuit 21*a* drives the mentioned base resistance 11*b* to open the switching element 11*a* when a voltage of the first terminal Vdd1, to which an output voltage of switching element 11*a* is applied, is below a predetermined value (DC5V for example).

Numeral 22*a* is a control circuit comprising a microprocessor, various memories, etc. that are not shown. Numeral 23 is an input interface circuit of noise filter, etc. Numeral 24 is an output interface circuit of latch memory, etc. Input signal from the on-vehicle input equipment is supplied to the mentioned control circuit 22*a* through the input connector 3*a*, input interface circuit 13*a* and input interface circuit 23. Control output from the control circuit 22*a* drives the on-vehicle output equipment through the output interface circuit 24, output interface circuit 14*a* and output connector 4*a*.

As constituent elements of the constant voltage control circuit 21*a*, numeral 25*a* is a switching circuit composed of drive control transistors of base resistance 11*b*. Numeral 26 is a comparison circuit that compares a stabilized voltage Vdd applied to the first terminal Vdd1 with a reference voltage (not shown) and acts on the switching circuit 25*a* to open the switching element 11*a* when the stabilized voltage Vdd is below a predetermined value (5.0V, for example).

Numeral 40*a* is an abnormal voltage comparison circuit that compares a stabilized voltage Vdd applied to the second terminal Vdd2 with a reference voltage (not shown) and generates an alarm output for alarm terminal output 42 when the stabilized voltage Vdd exceeds a predetermined value (5.1V for example). Numeral 41 is a diode disposed within the IC element 20*a* and connected between the second terminal Vdd2 and first terminal Vdd1 in such a manner that direction from the second terminal toward the first becomes the forward direction. When an output of switching element 11*a* and the first terminal Vdd1 are disconnected, a feedback voltage is applied to the comparison circuit 26 from the second terminal Vdd2 through diode 41 and, further, power is supplied to the input-output interface circuits 23, 24 as well.

In the device of above arrangement shown FIG. 1, when a voltage Vb of the on-vehicle battery is applied to the power supply terminals 2*a* and 2*b* of the on-vehicle electronic control device 1*a*, the switching element 11*a* is conducted and controlled. Then a stabilized voltage Vdd is applied to the first terminal Vdd1 and the second terminal Vdd2 of the IC element 20*a*.

A voltage Vb of an on-vehicle battery is applied to input interface circuit 13*a* and output interface circuit 14*a* of 12V system, while a stabilized voltage Vdd=5V is applied from the first terminal Vdd1 to the input interface circuit 23 and output interface circuit 24 of 5V system.

Also, a stabilized voltage Vdd=5V is separately applied to the control circuit 22*a* from the second terminal Vdd2 being different from the first terminal Vdd1, and the control circuit 22*a* generates control output signals corresponding to input signals from various on-vehicle input equipment, thereby driving the on-vehicle output equipment.

Further, a voltage supplied to the first terminal Vdd1 is employed as feedback voltage for constant voltage control, and comparison circuit 26 and switching circuit 25*a* perform conduction control of the switching element 11*a* so that the predetermined stabilized voltage Vdd is obtained.

Furthermore, if any feeder circuit for the first terminal Vdd1 is disconnected, a feedback voltage is to be supplied through the diode 41. In this case, the stabilized voltage Vdd will be higher than normal voltage 5.0V by the amount corresponding to voltage drop of the diode 41 (5.3V for example).

As a result, the abnormal voltage comparison circuit 40*a* is activated to generate an abnormality alarm output in the alarm output terminal 42.

In addition, abnormalities that may occur in the on-vehicle electronic control device are transmitted in coded form to a display not shown, and therefore the alarm output terminal 42 can be replaced with a terminal for serial communication not shown.

Without the mentioned diode 41, in case that any feeder circuit for the first terminal Vdd1 is disconnected, the switching element 11*a* becomes fully conductive, which results in breakdown of the input-output interface circuits 23 and 24.

Prior to mounting IC element 20*a*, various inspections are performed separately on the IC element 20*a* itself, including current consumption inspection.

Inspection standard on the arrangement shown in FIG. 1 can be separately defined. More specifically, a current flowing into the first terminal Vdd1 when a predetermined voltage Vdd is applied thereto, can be defined as I1±ΔI1 (I1 indicates an average current and ΔI1 indicates a variation tolerance). A current flowing into the second terminal Vdd2 when a predetermined voltage Vdd is applied thereto, can be defined as I2±ΔI2 (I2 indicates average current and ΔI2 indicates a variation tolerance).

If the IC element 20*a* has only one power supply terminal Vdd1 and power to the control circuit 22*a* is supplied from the first terminal Vdd1, defining a current inspection standard as (I1+I2)±(ΔI1+ΔI2) will arise the following disadvantage.

For example, in case that current consumption of any interface circuit system of an IC element to be inspected happens to be at the lower limit of I1−ΔI1, a current consumption value of the control circuit system in the following formula will be regarded as tolerable, which means that a product that should be excluded as defective may pass as non-defective.

$$\text{Upper limit of total current}=(I1+I2)+(\Delta I1+\Delta I2)$$

$$\text{Upper limit of current on control circuit system}=(I1+I2)+(\Delta I1+\Delta I2)-(I1-\Delta I1)=I2+(2\Delta I1+\Delta I2)$$

Whereas, real upper limit of current on the control circuit system=I2+ΔI2

In general, current consumption of the input-output interface circuits 23, 24 mainly constituted of a resistance circuit is comparatively large, and therefore performance level of such a component tends to be more dispersed and not uniform. Therefore, it is significant, in view of improvement in inspection precision, to separately feed (divided feeding) the first terminal Vdd1 and the second terminal Vdd2 for the interface circuit system and for the control circuit system mainly constituted of digital IC, and to establish separate inspecting standards as described above.

Embodiment 2

Figure 2:
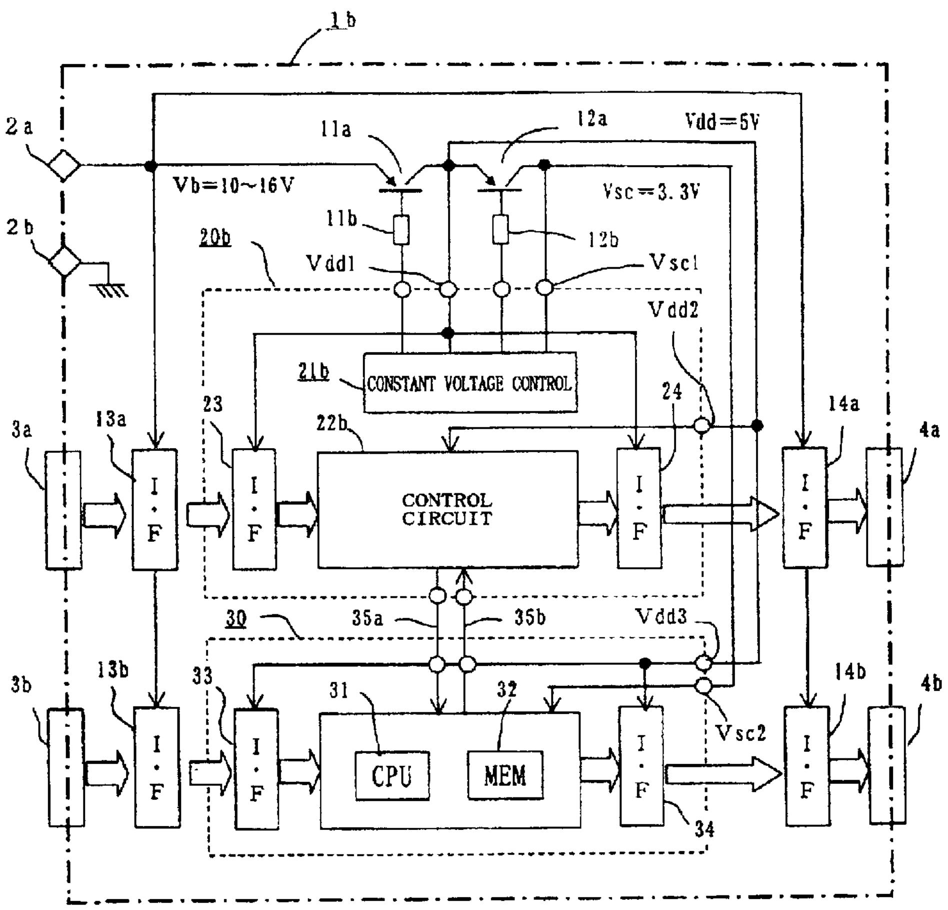
FIG. 2 is a block circuit diagram according to Embodiment 2 of the invention.

FIG. 2 is a block diagram of a circuit according to Embodiment 2 of the invention, which will be hereinafter described mainly on differences from the foregoing device shown in FIG. 1.

Numeral 1*b* is an on-vehicle electronic control device consisting of an electronic circuit board accommodated in a sealed box not shown. Numeral 3*b* is an input connector to which input signals such as ON/OFF signals or analog signals, etc. are supplied from various on-vehicle input equipment, and numeral 4*b* is an output connector to which ON/OFF driving signals for various on-vehicle output equipment are supplied.

Numeral 12*a* is a second switching element constituted of power transistors, etc. connected in series to the mentioned switching element 11*a*. Numeral 12*b* is a base resistance for conduction control of the mentioned second switching element. The mentioned switching element 12*a* is controlled so as to generate a constant voltage of, for example, Vsc=3.3V on terminals Vsc1 and Vsc2 as a stabilized voltage, with a constant voltage control circuit 21*b* described later.

Numeral 13*b* is an input interface circuit for converting a signal voltage of on-vehicle input equipment of, for example, DC12V system into a voltage of DC5V system, in which resistance elements, etc. consuming too much power to be incorporated in the second IC element 30 described later are used.

Numeral 14*b* is an output interface circuit for driving on-vehicle output equipment of, for example, DC12V system, in which power transistors, etc. consuming too much power to be incorporated in the second IC element 30 described later are used.

In the IC element 20*b* of above arrangement, numeral 21*b* is a constant voltage control circuit described later with reference to FIG. 3. Numeral 22*b* is a control circuit comprised of logic circuit elements, AD converter, etc. not shown, and has a low voltage terminal Vsc1 in addition to the first terminal Vdd1 and the second terminal Vdd2.

In the mentioned second IC element 30, numeral 31 is a microprocessor, and numeral 32 is various memories cooperating with the mentioned microprocessor. Numeral 33 is an input interface of noise filter, etc., and numeral 34 is an output interface circuit of latch memory, etc. Input signals from the on-vehicle input equipment are supplied to the microprocessor 31 through the input connector 3*b*, input interface circuit 13*b* and input interface circuit 33. Control output from the microprocessor 31 drives the on-vehicle output equipment through the output interface circuit 34, output interface circuit 14*b* and output connector 4*b*.

Numeral 35*a* and 35*b* are serial circuit lines for connection between control circuit 22*b* and a series-parallel converter not shown and incorporated in the microprocessor 31.

Vdd3 is a third terminal to which the mentioned stabilized voltage Vdd is supplied, and the input interface circuit 33 and output interface circuit 34 are supplied with power from this third terminal Vdd3.

Vsc2 is a low voltage terminal to which the stabilized voltage Vdd is supplied, and microprocessor 31 and various memories 32 are supplied with power from this low voltage terminal Vsc2.

In addition, the mentioned input interface circuit 13*b* and output interface circuit 14*b* are activated by a power voltage Vb supplied to the power supply terminals 2*a* and 2*b*.

Figure 3:
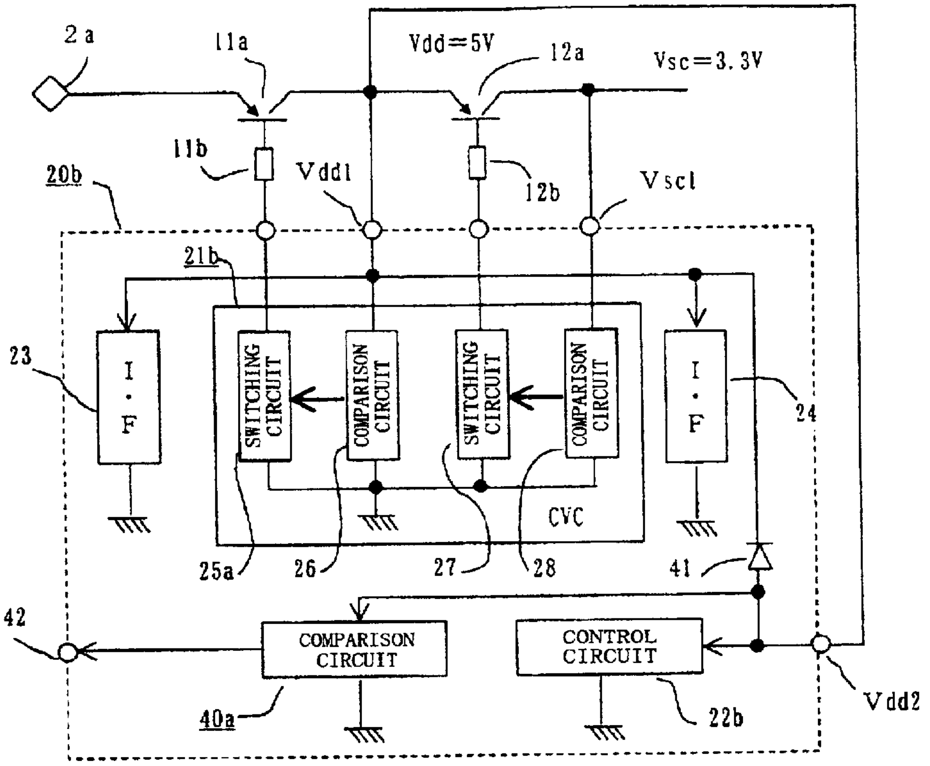
FIG. 3 is a partially detailed circuit diagram according to Embodiment 2 of the invention.

FIG. 3 is a partially detailed circuit diagram of the IC element 20*b* shown in FIG. 2.

As constituent elements of the constant voltage control circuit 21*b* shown in FIG. 3, numeral 25*a* is a switching circuit composed of drive control transistors of the mentioned base resistance 11*b*. Numeral 26 is a comparison circuit that compares a stabilized voltage Vdd applied to the first terminal Vdd1 with a reference voltage not shown and acts on the switching circuit 25*a* to open the switching element 11*a*, in case that the stabilized voltage Vdd is below a predetermined value (5.0V for example). Numeral 27 is a second switching circuit composed of the drive control transistors of the mentioned base resistance 12*b*. Numeral 28 is a comparison circuit that compares a stabilized low voltage Vsc applied to a low voltage terminal Vsc1 with a reference voltage not shown and acts on the second switching circuit 27 to open the second switching element 12*a* in case that the stabilized low voltage Vsc is below a predetermined value (3.3V for example).

Further, the device is provided with an abnormal voltage comparison circuit 40*a* and a diode 41 are provided in the same manner as in the foregoing Embodiment 1, to perform a function in the same manner as in Embodiment 1.

In the device of above arrangement shown FIG. 2, when a voltage Vb of an on-vehicle battery is applied to the power supply terminals 2*a* and 2*b* of the on-vehicle electronic control device 1*b*, the switching element 11*a* is conducted and controlled so that a stabilized voltage Vdd is applied to the first terminal Vdd1 and the second terminal Vdd2 of the IC element 20*b*.

A voltage Vb of the on-vehicle battery is applied to the input interface circuit 13*a*, 13*b* and output interface circuit 14*a*, 14*b* of 12V system. And a stabilized voltage Vdd=5V is applied to the input interface circuit 23, 33 and output interface circuit 24, 34 of 5V system, from the first terminal Vdd1 and the third terminal Vdd3.

Also, the stabilized voltage Vdd=5V is applied to the control circuit 22*b* from the second terminal Vdd2, and the control circuit 22*b* generates control output signals corresponding to input signals from various on-vehicle input equipment, thereby driving the on-vehicle output equipment.

Likewise, a stabilized low voltage Vsc=3.3V is applied to the microprocessor 31 or various memories 32 through the low voltage terminal Vsc2, and the microprocessor 31 generates control output signals corresponding to input signals from various on-vehicle input equipment, thereby driving the on-vehicle output equipment.

In addition, a part of the control signals from the control circuit 22*b* and the microprocessor 31 can be intercommunicated through serial circuits 35*a* and 35*b*.

In the device of above arrangement shown in FIG. 3, the voltage supplied to the first terminal Vdd1 is employed as a feedback voltage for constant voltage control. The comparison circuit 26 and switching circuit 25*a* perform conduction control of switching element 11*a* so that the predetermined stabilized voltage Vdd is obtained.

Likewise, the voltage supplied to the low voltage terminal Vsc1 is employed as feedback voltage for constant voltage control, and the second comparison circuit 28 and the second switching circuit 27 perform conduction control of the second switching element 12*a* so that the predetermined stabilized low voltage Vdd is obtained.

In addition, as described with reference to the foregoing Embodiment 1, if any feeder circuit for the first terminal Vdd1 is disconnected, a feedback voltage is supplied through the diode 41, and the abnormal voltage comparison circuit 40*a* is activated to generate an abnormal alarm output.

Without the mentioned diode 41, in case that any feeder circuit for the first terminal Vdd1 is disconnected, the switching element 11*a* becomes fully conductive, which results in breakdown of the input-output interface circuits 23, 24, 33, 34 and control circuit 22*b*.

When inspecting current consumption of the IC element 20*b*, it is preferable to measure a current value by applying a slightly higher voltage (5.1V for example) to the first terminal Vdd1 than to the second terminal Vdd2. In this sense, a slightly lower voltage (for example 5.0V) is applied to the second terminal Vdd2 than to the first terminal Vdd1. As a result, despite that the diode 41 is incorporated, the IC element 20*b* itself can be inspected with a higher precision by divided feeding.

For the IC element 30 commonly used, inspection of current consumption can be performed with a higher precision by divided feeding conducted by the third terminal Vdd3 and low voltage terminal Vsc2.

In addition, in the device having a stabilized power source of two systems shown in FIG. 2, it is preferable to add such function as detecting abnormality and outputting an alarm either in the IC element 20*b* or in the common second IC element 30, or shutting off the switching element 11*a* or the second switching element 12*a*, in case that any feeder circuit for the low voltage terminal Vsc1 is disconnected.

Further, in this Embodiment 2, it is also preferable to feed the input-output interface circuits 23, 24 from the second terminal Vd22 while feeding the control circuit 22 from the first terminal Vdd1.

Embodiment 3

Figure 4:
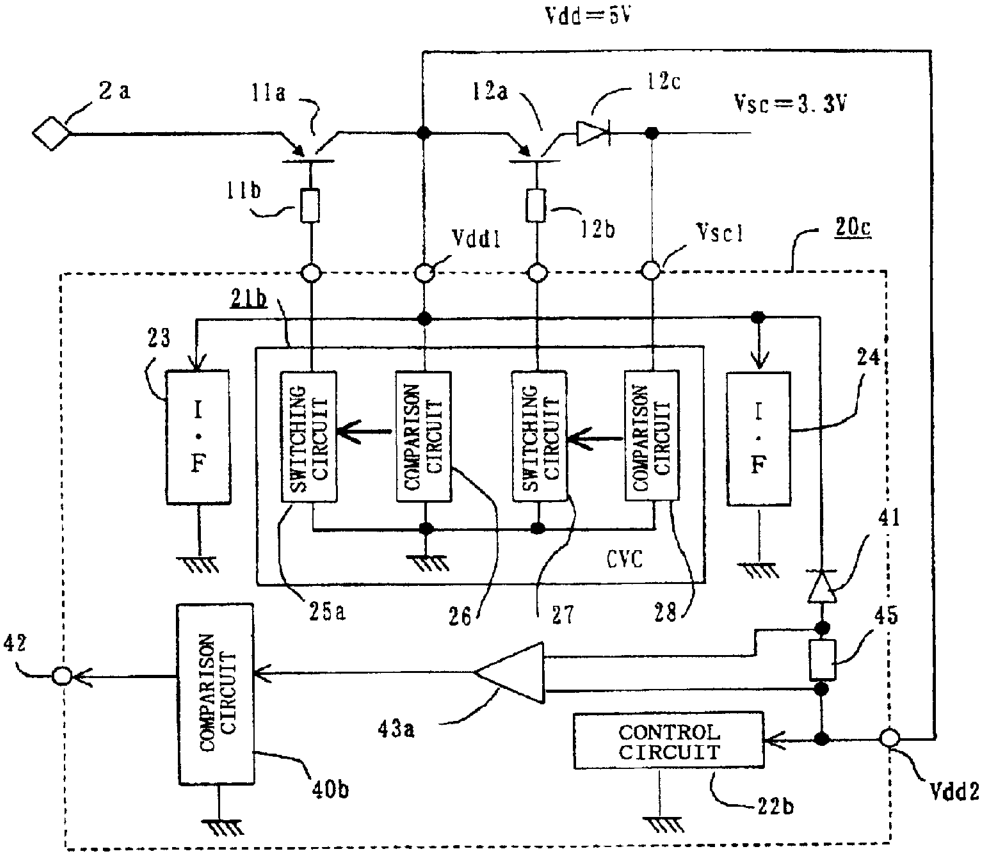
FIG. 4 is a partially detailed circuit diagram according to Embodiment 3 of the invention.

FIG. 4 is a partially detailed circuit diagram of an IC element 20*c* according to Embodiment 3 of the invention, 1 which will be hereinafter described mainly on differences from the foregoing device shown in FIG. 3.

In FIG. 4, numeral 12*c* is a dropper diode connected in series to the second switching element 12*a* . Numeral 40*b* is an abnormal voltage comparison circuit that amplifies voltages on both ends of a detecting resistance 45 in an amplifier 43*a* and generates an alarm output for an alarm output terminal 42 in case that a current running on the diode 41 exceeds a predetermined value.

In the device of above arrangement shown in FIG. 4, in case that any feeder circuit for the first terminal Vdd1 is disconnected, a driving current for the input-output interface circuits 23, 24 is also supplied through the diode 41. Therefore output voltage of the amplifier 43 becomes excessively large and the abnormal voltage comparison circuit 40*b* generates an alarm output.

The dropper diode 12*c* is operated for restraining the stabilized low voltage Vsc from excessively increasing and for preventing the microprocessor 31 or various memories 32 from breakdown, in case that the low voltage terminal Vsc1 is disconnected to make the second switching element 12*a* fully conductive.

Embodiment 4

Figure 5:
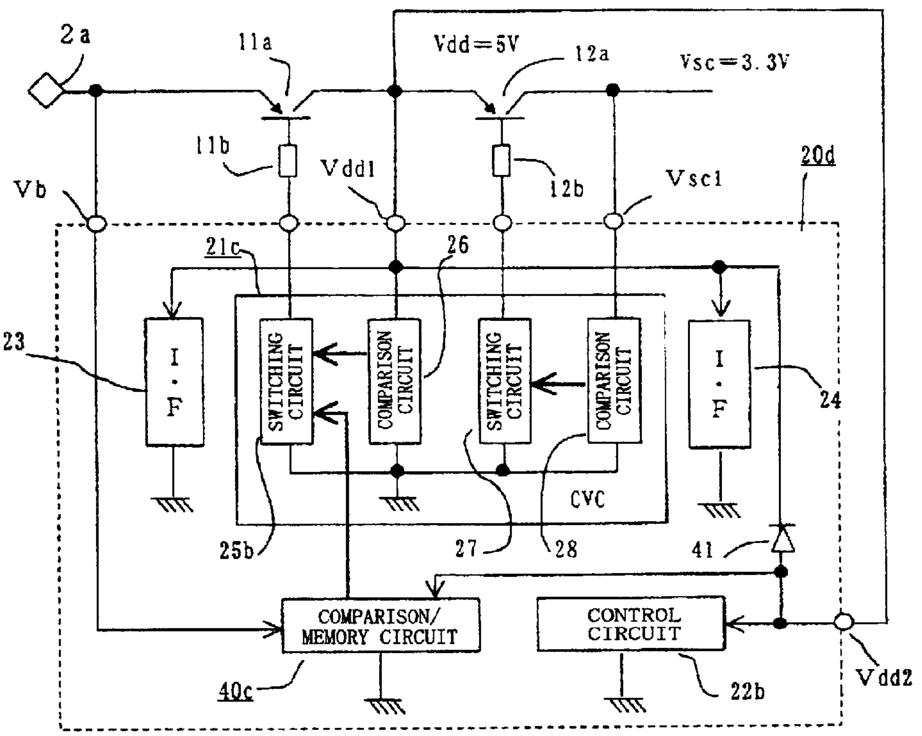
FIG. 5 is a partially detailed circuit diagram according to Embodiment 4 of the invention.

FIG. 5 is a partially detailed circuit diagram of an IC element 20*d* according to Embodiment 4 of the invention, which will be hereinafter described mainly on differences from the foregoing device shown in FIG. 3.

In FIG. 5, numeral 40*c* is a voltage comparison/memory circuit that is activated to shut off the switching element 11*a* through the switching circuit 25*b* in the constant voltage control circuit 21*c* when a voltage of the second terminal Vdd2 exceeds a predetermined value. Further, such an abnormal state is stored in the circuit 40*c* to which a voltage Vb of on-vehicle battery applied to power supply terminal 2*a* is supplied.

In the device of above arrangement shown in FIG. 5, if any feeder circuit for the first terminal Vdd1 is disconnected, a feedback voltage is supplied to the comparison circuit 26 through the diode 41. In this case, the stabilized voltage Vdd will be higher by the amount corresponding to voltage drop of the diode 41. As a result, the voltage comparison/memory circuit 40*c* is activated to shut off the switching circuit 25*b*, thereby closing the switching element 11*a*.

In addition, the foregoing abnormal state is stored and the switching element 11*a* remains closed as long as a voltage at the power supply terminal 2*a* is not shut off.

Embodiment 5

Figure 6:
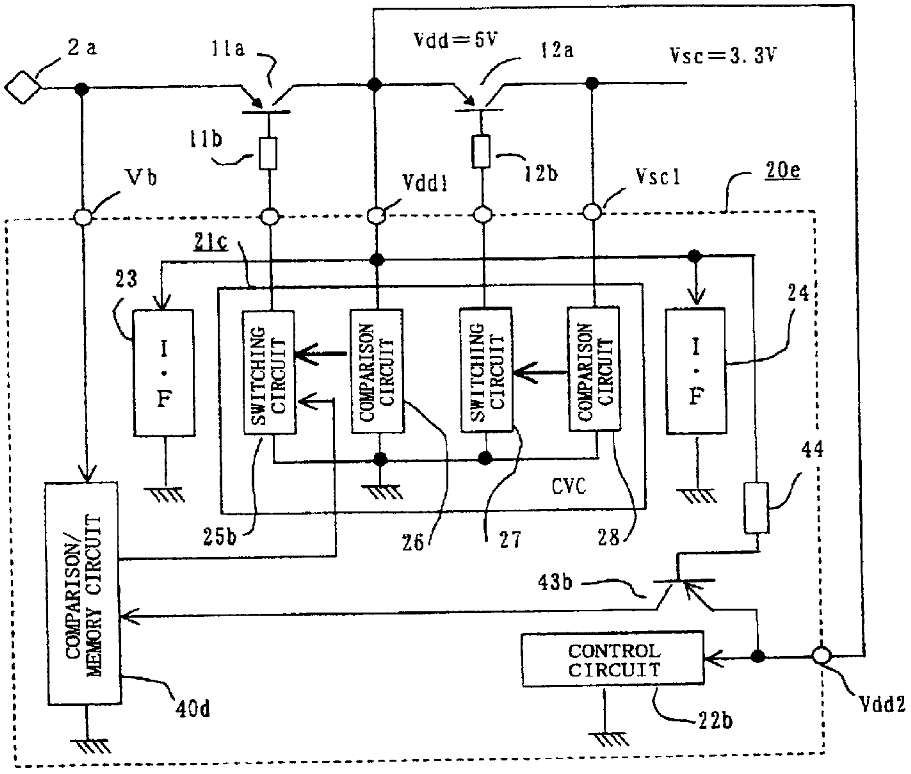
FIG. 6 is a partially detailed circuit diagram according to Embodiment 5 of the invention.

FIG. 6 is a partially detailed circuit diagram of an IC element 20*e* according to Embodiment 5 of the invention, which will be hereinafter described mainly on differences from the device shown in FIG. 3.

In FIG. 6, numeral 43*b* is a transistor in which an emitter terminal is connected to the second terminal Vdd2 and a base terminal is connected to the first terminal Vdd1 through the base resistance 44. Numeral 40*d* is a current comparison/memory circuit that, upon being driven by the mentioned transistor 43*b*, shuts off the switching element 11*a* through the switching circuit 25*b* in the constant voltage control circuit 21*c*. Further, such an abnormal state is stored in the circuit 40 to which a voltage Vb of on-vehicle battery applied to the power supply terminal 2*a* is supplied.

In the device of above arrangement shown in FIG. 6, if any feeder circuit for the first terminal Vdd1 is disconnected, a current runs through the base resistance 44, and the transistor 43*b* becomes conductive. As a result, the current comparison/memory circuit 40*d* is activated to close the switching circuit 25*b* and the switching element 11*a*.

The foregoing abnormal state is stored and the switching element 11*a* remains closed as long as a voltage at the power supply terminal 2*a* is not shut off.

In addition, in case that the switching element 11*a* is to shut off upon occurring any abnormal state as is done in the foregoing embodiments of FIGS. 5 and 6, the on-vehicle electronic control device will completely stop its operation. Therefore, means for detecting abnormality of superior level (not shown) is to generate an alarm of such abnormality.

As the constant voltage control circuit employed in each of the foregoing embodiments, it is preferable to employ the circuit arranged as shown in each of FIGS. 2, 3 and 4 of the aforementioned Japanese Patent Application No. 173124/2000. Further, other than such constant voltage control circuits, it is also preferable to employ a voltage control circuit with a drop characteristic, which gradually reduces output voltage as load current becomes larger.

What is claimed is:

1. An on-vehicle electronic control device comprising: an IC element including an input-output interface circuit connected to on-vehicle input-output equipment and a control circuit; and in which a stabilized voltage is supplied from a power supply tetminal connected to an on-vehicle battery to said IC element through a switching element;

wherein said IC element incorporates a voltage control circuit for conduction control of said switching element so that a voltage of a first terminal, to which an output voltage of said switching element is supplied, becomes a predetermined voltage, and a second terminal to which an output voltage of said switching element is supplied; and said input-output interface circuit and the control circuit are supplied with a power separately either from said first terminal or from the second terminal.

2. The on-vehicle electronic control device according to claim 1, wherein said voltage control circuit comprises:

a comparison circuit for generating an output when a voltage of the first terminal, to which an output voltage of said switching element is supplied, is lower than a predetermined voltage; and a switching circuit for controlling conduction of said switching element depending on output of the mentioned comparison circuit.

3. The on-vehicle electronic control device according to claim 1, further comprising: a second IC element including an input-output interface circuit, microprocessor and various memories; and a second switching element connected in series to said switching element for supplying a stabilized low voltage to said microprocessor and memories; and in which the input-output interface circuit for said microprocessor is supplied with a power from a third terminal connected to the output circuit of said switching element.

4. The on-vehicle electronic control device according to claim 3, wherein said voltage control circuit includes a second constant voltage control circuit comprising a second comparison circuit for generating an output when a voltage of a low voltage terminal, to which an output voltage of said second switching element is supplied, is lower than a predetermined voltage, and a second switching circuit for controlling conduction of said second switching element so that said stabilized low voltage is obtained depending on output of said comparison circuit.

5. The on-vehicle electronic control device according to claim 1, wherein a diode is incorporated and connected between the first and the second terminals of said IC element in such a manner that a direction from said second terminal to the first terminal is a forward direction, and said comparison circuit is supplied with a power through said diode when any imperfect contact takes place in a circuit to which power is supplied from said first terminal.

6. The on-vehicle electronic control device according to claim 5, wherein said IC element incorporates an abnormal voltage comparison circuit for monitoring voltage variation in said second terminal and generating an alarm output when said monitored voltage exceeds a predetermined value.

7. The on-vehicle electronic control device according to claim 5, wherein said IC element includes a current detecting element for detecting a current running from said second terminal toward the first terminal, and an abnormal current comparison circuit for generating an alarm output when a current detected by said current detecting element exceeds a predetermined value.

8. The on-vehicle electronic control device according to claim 1, wherein said IC element includes a voltage comparison/memory circuit for monitoring voltage variation in said second terminal and acting on said switching circuit to shut off said switching element when said monitored voltage exceeds a predetermined value, and for storing such an abnormal state, and in which said voltage comparison/memory circuit is supplied with a power from an input voltage circuit of said switching element.

9. The on-vehicle electronic control device according to claim 1, wherein said IC element includes a current detecting element for detecting a current running from said second terminal toward the first terminal, and a current comparison/memory circuit for acting on said switching circuit to shut off said switching element when said monitored current exceeds a predetermined value, and for storing such an abnormal state; and in which said current comparison/memory circuit is supplied with a power from an input voltage circuit of said switching element.

10. An on-vehicle electronic control device comprising: an IC element including an input-output interface circuit connected to on-vehicle input-output equipment and a control circuit; and in which a stabilized voltage is supplied from a power supply terminal connected to an on-vehicle battery to said IC element through a switching element;

wherein said IC element incorporates a voltage control circuit for conduction control of said switching element so that a voltage of a first terminal, to which an output voltage of said switching element is supplied, becomes a predetermined voltage, and a second terminal to which an output voltage of said switching element is supplied; and said input-output interface circuit and the control circuit are supplied with a power separately either from said first terminal or from the second terminal, said voltaage control circuit comprises: a comparison circuit for generating an output when a voltage of the first terminal, to which an output voltage of said switching element is supplied, is lower than a predetermined voltage; and a switching circuit for controlling conduction of said switching element depending on output of the mentioned comparison circuit, and a diode is incorporated and connected between the first and the second terminals of said IC element in such a manner that a direction from said second terminal to the first terminal is a forward direction, and said comparison circuit is supplied with a power throuqh said diode when any imperfect contact takes place in a circuit to which power is supplied from said first terminal.

11. The on-vehicle electronic control device according to claim 10, further comprising: a second IC element including an input-output interface circuit, microprocessor and various memories; and a second switching element connected in series to said switching element for supplying a stabilized low voltage to said microprocessor and memories; and in which the input-output interface circuit for said microprocessor is supplied with a power from a third terminal connected to the output circuit of said switching element, and said voltage control circuit includes a second constant voltage control circuit comprising a second comparison circuit for generating an output when a voltage of a low voltage terminal, to which an output voltage of said second switching element is supplied, is lower than a predetermined voltage, and a second switching circuit for controlling conduction of said second switching element so that said stabilized low voltage is obtained depending on output of said comparison circuit.

12. The on-vehicle electronic control device according to claim 10, wherein said IC element incorporates an abnormal voltage comparison circuit for monitoring voltage variation in said second terminal and generating an alarm output when said monitored voltage; exceeds a predetermined value.

13. The on-vehicle electronic control device according to claim 10, wherein said IC element includes a current detecting element for detecting a current running from said second terminal toward the first terminal, and an abnormal current comparison circuit fog, generating an alarm output when a current detected by said current detecting element exceeds a predetermined value.

14. The on-vehicle electronic control device according to claim 10, wherein said IC element includes a voltage comparison/memory circuit for monitoring voltage variation in said second terminal and acting on said switching circuit to shut off said switching element when said monitored voltage exceeds a predetermined value, and for storing such an abnormal state, and in which said voltage comparison/memory circuit is supplied with a power from an input voltage circuit of said switching element.

15. The on-vehicle/electronic control device according to claim 10, wherein said IC element includes a current detecting element for detecting a current running from said second terminal toward the first terminal, and a current comparison/memory circuit for acting on said switching circuit to shut off said switching element when said monitored current exceeds a predetermined value, and for storing such an abnormal state; and in which said current comparison/memory circuit is supplied with a power from an input voltage circuit of said switching element.

* * * * *